United States Patent
Siegler, Jr.

[15] 3,704,955
[45] Dec. 5, 1972

[54] RADIATION ENTRAPPING, MULTI-REFLECTION RAMAN SAMPLE CELL EMPLOYING A SINGLE CONCAVE MIRROR

[72] Inventor: Edouard Horace Siegler, Jr., Claremont, Calif.

[73] Assignee: Cary Instruments, Monrovia, Calif.

[22] Filed: Feb. 19, 1970

[21] Appl. No.: 12,628

[52] U.S. Cl. .................................................. 356/244
[51] Int. Cl. ............................................ G01n 21/24
[58] Field of Search ....... 331/94.5; 356/75, 103, 102, 356/244, 246; 350/294

[56] References Cited

UNITED STATES PATENTS 3,414,354   12/1968   Siegler .......................... 356/75
3,428,914   2/1969    Bell ............................ 331/94.5

OTHER PUBLICATIONS

Herriott & Schulte, " Folded Optical Delay Lines" Applied Optics, Vol. 4, No. 8, Aug. 1965, pp. 883–889.

*Primary Examiner*—William L. Sikes
*Assistant Examiner*—Orville B. Chew, II
*Attorney*—White & Haefliger

[57] ABSTRACT

Apparatus for passing light repeatedly through a sample in a sample space comprises two longitudinally separated reflectors one of which is concave and the other of which is planar, the reflectors located to repeatedly reflect a light beam therebetween for passage repeatedly through the sample space.

15 Claims, 4 Drawing Figures

INVENTOR.
EDOUARD HORACE SIEGLER, JR.
BY White & Haefliger
ATTORNEYS.

RADIATION ENTRAPPING, MULTI-REFLECTION RAMAN SAMPLE CELL EMPLOYING A SINGLE CONCAVE MIRROR

BACKGROUND OF THE INVENTION

This invention relates generally to spectroscopy and more particularly concerns enhancement of sample illumination in spectroscopic systems, the invention having a high degree of utility in Raman spectrophotometers.

In commonly assigned Vernon L. Chupp application Ser. No. 832,102 for U. S. Letters Patent filed June 11, 1969 now abandoned, there is described apparatus operable to collect as much Raman light as possible from a very small sample, using a laser for excitation, thereby to increase substantially the intensity level of the Raman light, facilitating its separation from other radiation as well as efficient detection as by means of a photodetector. The exciting radiation is then caused to pass many times through the small sample, and in such manner as to trap the exciting radiation so that it cannot leave the sample or the optical system which produces the trapping effect.

The Chupp system can be relatively expensive to produce in large part to the need for two concave reflectors of extremely high reflectance, both required to operate in air. Additionally, the Chupp system is subject to the necessity for particularly accurate and expensive mounting and alignment means for each mirror; and the number of passes of the beam through interfaces of high refractive index undesirably reduces the transmission efficiency of the system.

SUMMARY OF THE INVENTION

It is a major object of the invention to improve upon the Chupp system in such manner as to eliminate or reduce the above referred to disadvantages. Generally speaking, and in accordance with the invention, a reflector is in effect placed at the optical center of the Chupp system, so that the "entrance-side" concave mirror also functions as a "far-side" mirror, eliminating need for the latter. By suitable design, the sample path length can be made equal to that of a Chupp-type cell, producing nearly the same parameters of illumination for the monochromator, but eliminating the glass-to-air-and-return pass at the far side of the sample cell and substituting reflection at a dielectric mirror for that at the unprotected far-side mirror. Accordingly, the cost of mirrors is substantially reduced, with no significant performance loss.

Basically, then, the invention is embodied in the combination that comprises two longitudinally separated reflectors one of which is concave (for example spherical or ellipsoidal) and the other of which is planar, the reflectors located to reflect a beam of light repeatedly between them for repeated passage through the sample space. In the case of the spherical reflector, its center of curvature lies in the sample space between the reflectors and close to the planar reflector, and in the case of the ellipsoidal reflector it has an actual focus in the sample space between the reflectors and a virtual focus at the far side of the planar mirror, the latter being half-way between the two foci.

In addition, the sample space may be defined by a sample cell having spaced windows through which the beam repeatedly passes, the planar mirror being a dielectric mirror located adjacent that window furthest from the concave mirror. The beam-passing surfaces of the windows are typically glassy (as for example fused silica); anti-reflection coatings may be used to reduce reflection losses.

These and other objects and advantages of the invention, as well as the details of illustrative embodiments, will be more fully understood from the following detailed description of the drawings.

DRAWING DESCRIPTION

DESCRIPTION OF PREFERRED EMBODIMENTS

Figure 1:
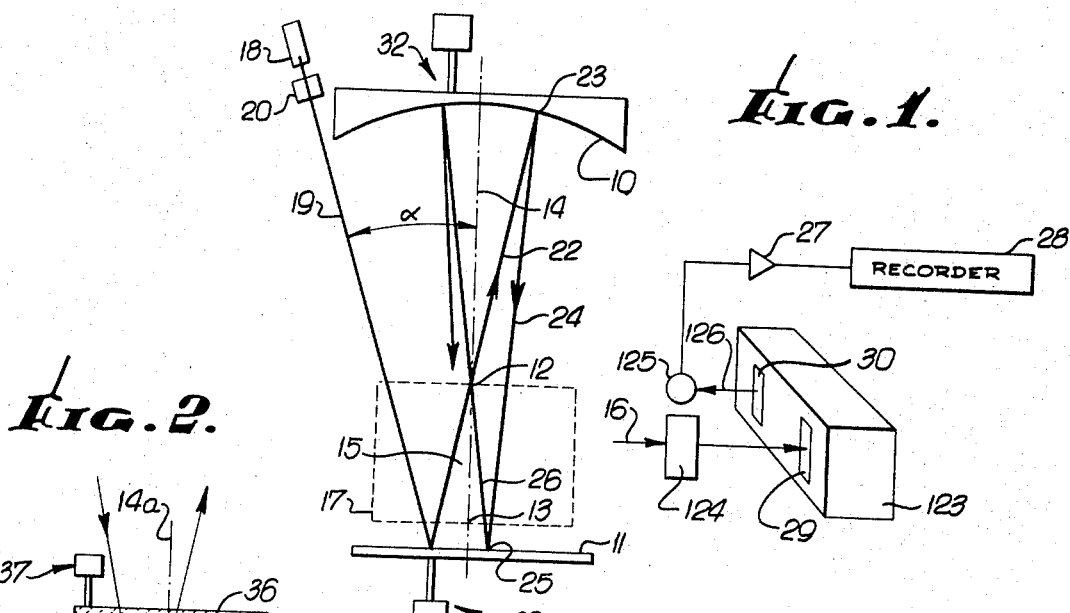
FIG. 1 is partly an elevation, partly an isometric, and partly a schematic drawing of an embodiment illustrating the principles of the invention.

Referring first to FIG. 1, a concave reflector 10 and a planar reflector 11 are shown as having longitudinal separation along a line 14 passing through two points 12 and 13. Reflector 10 may comprise a spherical mirror defining conjugate image point 12 and center of curvature point 13.

A sample fluid such as liquid or gas is to be received in whole or in part in the space 15 between the reflector 11 and point 12 in order that light, especially laser light, trapped to pass repeatedly through point 12 and space 15 may pass repeatedly through the sample to result in high intensity level Raman light emission from the sample in the lateral direction 16. The broken line 17 schematically indicates one disposition of a sample container characterized in that the bulk of the sample extends within and throughout the major length of space 15 for enhancement of emitted Raman light intensity. Note in this regard that the center of curvature 13 of spherical reflector 10 lies between the reflectors and relatively close to the planar reflector 11.

Also contemplated is the provision of means to direct such light in a beam for passage through space 15 and repeated reflection by the mirrors. As one example, a laser is indicated at 18 directing a coherent light beam 19 through an optical system 20 (as for example a lens or lenses) operating to focus the beam for reflection by the mirror and passage at 22 through conjugate image point 12. The direction of the beam 19 is "off-axis" at an acute angle $\alpha$ relative to linear axis 14. Beam 22 is reflected at 23 on mirror 10 to pass at 24 back to mirror 11 for reflection at 25 and return at 26 through point 12. As is evident, repeated reflections occur with the light beam converging toward line 14, to give maximum illumination of zone 15 by "entrapment" of the exciting light. While some slight magnification will occur upon each reflection, if the spacing of point 12 from mirror 11 is minimized, or small, relative to the longitudinal spacing of mirror surfaces 10 and 11, the magnification effects are minimized and the reflected light can be caused to pass between 10 and 100 times through point 12 and space 15, before the successive magnifications, causing the beam diameter to exceed the width of the slit image, and reflection losses at the mirrors reduce the usable residual light flux to a small fraction of its original level. This number of passes is definitive of a very efficient light collecting cell.

Means to collect light (as for example Raman light) transmitted at 16 may for example include a monochromator 123 to which light is directed by optical system 124. The monochromator operates to disperse the radiation from the illuminated sample, and in so doing to reduce the intensity of undesired background radiation compared with the intensity of the spectral lines being detected, as referred to in U. S. Pat. No. 2,940,355 to H. H. Cary. In this regard, photodetector 125 receives dispersed radiation at 126 from the monochromator; an amplifier 27 is connected to the output of the photodetector; and a recorder 28 is connected to the amplifier output. The photodetector serves to generate an electrical signal corresponding to the intensity of at least a portion (as for example the Raman portion) of the light emitted at 16 from the sample.

For highest efficiency, the spacing of the conjugate image point 12 from mirror 11 may be such, in relation to the length of the monochromator entrance slit 29, that the reduced slit image found at zone 15 has opposite ends near and preferably close to the point 12 and the mirror 11 respectively. Note that the optical system 124 images the long, narrow entrance slit 29 at the gap between point 12 and the mirror, and conversely, images the gap between point 12 and the mirror at the slit. The monochromator exit slit is designated at 30.

The separation of the two mirrors is in principal one-half the separation as calculated for a system using two concave mirrors, as described in Vernon L. Chupp application Ser. No. 832,102 for U. S. Letters Patent, filed June 11, 1969. Also, the spacing of point 12 from the mirror 11 is one-half the spacing between a pair of conjugate image points as described in that Chupp application, for either liquid or gas samples. Compensation for the differences in refractive indices of different sample liquids in the sample cell, and for the refractive index of the material of the cell windows, may be made by moving either of the mirrors and/or the sample cell along axis 14, as described in the Chupp application. Devices to so move the mirrors are schematically indicated at 32 and 33.

Figure 2:
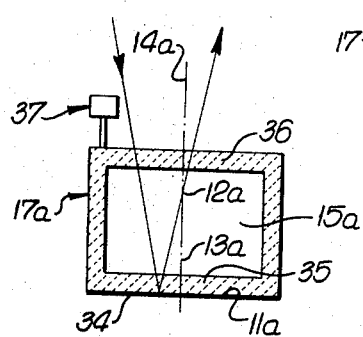
FIG. 2 is a view showing a sample holder with dielectric mirror attached.

One usable sample cell is illustrated at 17a in FIG. 2, the planar mirror 11a being a dielectric mirror carried on the outwardly facing side 34 of the cell wall 35. Walls 35 and 36 at opposite sides of the sample space 15a define cell windows through which the beam repeatedly passes, and the beam-passing surfaces of those windows are parallel to the planar mirror 11a. Such surfaces are typically glassy, and may for example consist of fused silica. A device to adjustably displace the sample cell along the direction of axis 14a is indicated schematically at 37.

Figure 3:
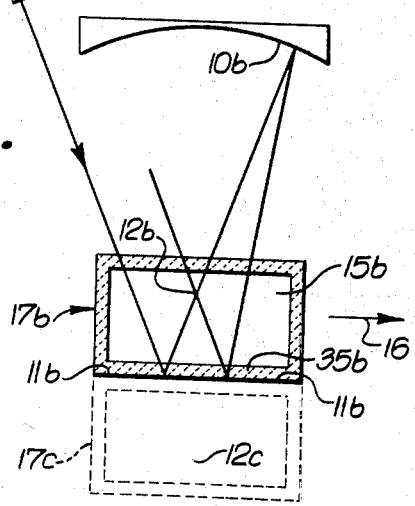
FIG. 3 is an elevational view similar to part of FIG. 1, but illustrating use of an ellipsoidal mirror.

FIG. 3 illustrates an apparatus similar to that described in FIGS. 1 and 2, and including a sample cell 17b, a planar mirror 11b carried on cell wall 35b, a sample space 15b in the cell; however, the concave mirror 10b is in this case ellipsoidal.

The image point 12b is now at a focus of the ellipsoidal mirror, the other focus being virtual and located at point 12c within a virtual image 17c of the cell 17b. The planar mirror surface 11b is located half-way between the foci 12b and 12c. Those points may be more generally considered as "effective" foci, as distinguished from "actual" foci, the former being shifted from the latter along axis 14 (in the "downward" direction as drawn, assuming the concave mirror to be held fixed), where refractive indices of the sample cell and sample liquid are taken into consideration.

Figure 4:
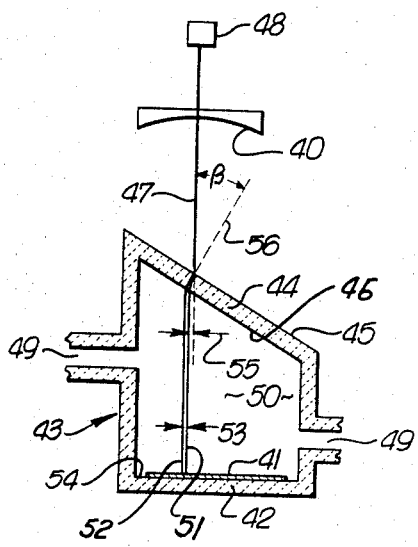
FIG. 4 is an elevational view showing a modified form of the invention.

Finally, FIG. 4 illustrates a "special case" of the invention — a modified system useful only for gaseous specimens, and incorporating a concave mirror 40, a planar mirror 41 carried on the wall 42 of cell 43, and the cell window 44 furthest from mirror 41 being of special character. Window inner surface 46 is parallel to window outer surface 45, both being angled relative to the beam 47 in such relation that the reflection loss resulting from incidence of the bean on either surface is essentially zero. To obtain this condition, planar window surfaces 46 and 45 are made to lie with their normal 56 at the well-known "Brewster" angle $\beta$ relative to beam 47. Note that the beam emanates from laser 48, passes centrally above the mirror 40 (that is, out of the plane of the drawing, angled toward that plane), and then is directed as shown to be reflected back and forth between the mirrors 40 and 41 and through sample space 50.

FIG. 4 is a view taken at right angles to the views of the other three figures, so the converging "fan" of ray paths between the mirrors is not readily shown — but is present, along with typically, the collection optics, monochromator and electronics discussed earlier.

The center of curvature or focus of mirror 40 is located exactly as already described for the general case of the invention, the optical axis of the system merely being bent at surfaces 45 and 46 in accordance with refraction of the laser beam at the Brewster window.

Within the cell, the beam paths — as at 51 and 52 — are parallel (in projection) to the path 47 outside the cell. When a ray 47 is considered to be a nearly axial ray, representative of rays occurring after substantial convergence of light to the system axis, the corresponding ray 51 inside the cell will be found displaced by the distance 55. If the ray 47 is considered to be a substantially off-axis ray, as for example, a ray coming directly from laser 48, then the corresponding ray 52 within the cell will be found displaced by the *additional* distance 53. Suitable selection of entrance angle $\alpha$ (FIG. 1) and minimization of window 44 thickness adequately minimizes beam spread 53 within the cell.

Operation of the cell in highly efficient Brewster-angle mode, *free* of anti-reflection coatings within and without, depends on parallelism of ray 47 with rays 51 and 52 in the projection of FIG. 4, and this in turn requires nonvariation of refractive index of specimens in space 50, from one specimen to another. Since liquid specimens have considerable range of refractive index, this "special-case" cell appears to have practical utility only for gaseous samples, whose refractive index generally equals (to adequate approximation for this purpose) that of the air outside the cell.

Reflector 41 is advantageously placed within the cell to avoid reflection loss at upper surface 54 of wall 42, and the cell structure 43 is advantageously provided with one or more ports 49 for admission and removal of gaseous specimens.

I claim:
1. In apparatus for passing light repeatedly through a sample and sample space, the combination comprising
   a. two longitudinally separated reflectors one of which is spherically concave and the other of which is planar, the reflectors located to reflect repeatedly a light beam therebetween for repeated passage through the sample space in a substantially planar reflection array, the spherically concave reflector defining a center of curvature and two coincident conjugate image points,
   b. said center of curvature of the spherically concave reflector lying between the reflectors and close to but spaced from the planar reflector,
   c. and a sample holder defining said sample space between said center of curvature and said coincident conjugate image points, the spacing of the reflectors characterized in that successive reflections of the beam pass through at least one wall of the holder as well as through the sample space and converge toward a straight line extending through said center of curvature and said coincident conjugate image points.

2. In apparatus for passing light repeatedly through a sample and sample space, the combination comprising
   a. two longitudinally separated reflectors one of which is ellipsoidal and the other of which is planar, the reflectors located to reflect repeatedly a light beam therebetween for repeated passage through the sample space in a substantially planar reflection array,
   b. the ellipsoidal reflector having two coincident foci between the reflectors,
   c. and a sample holder defining said sample space between said coincident foci and said planar reflector the spacing of the reflectors characterized in that successive reflections of the beam pass through at least one wall of the sample holder as well as through the sample space and converge toward a straight line normal to the planar reflector and passing through said coincident foci, the foci located within said space.

3. The apparatus of claim 2 wherein the ellipsoidal reflector also has another focus, the two foci being effective foci, and the planar reflector located half the distance therebetween.

4. In apparatus for passing light repeatedly through a sample in a sample space, the combination comprising
   a. two longitudinally separated mirrors one of which is concave and the other of which is planar, the mirrors located to repeatedly reflect a light beam therebetween for passage repeatedly through said space, the concave reflector defining two coincident conjugate image points,
   b. a sample cell defining said space through which the beam passes during its repeated reflection between the mirrors, said space lying between the coincident conjugate image points and said planar reflector,
   c. the concave mirror being spaced from the cell and the planar mirror being adjacent a surface of the cell, and
   d. means to direct the beam for passage through said space and for reflection by said mirrors in a substantially planar reflection array, the spacing of the mirrors characterized in that successive reflections of the beam pass through at least one wall of the cell as well as through the sample space and converge toward a line normal to said planar mirror and passing through the coincident conjugate image points, the concave mirror defining a conjugate image point within the sample space.

5. The combination of claim 4 wherein said planar mirror comprises a dielectric mirror carried on a surface of the cell.

6. The combination of claim 4 wherein the cell has spaced windows through which the beam repeatedly passes and at opposite sides of said sample space, the beam-passing surfaces of each window being planar and parallel to said planar mirror.

7. The combination of claim 4 wherein the windows consist of fused silica.

8. The combination of claim 4 wherein the concave mirror is ellipsoidal and said image point is a focus thereof.

9. The combination of claim 4 wherein the concave mirror is spherical.

10. The combination of claim 4 wherein said beam consists of laser light, and including means for collecting Raman light transmitted from a sample in the sample space.

11. The combination of claim 4 wherein said planar mirror is outside the cell.

12. The combination of claim 4 wherein said planar mirror is inside the cell.

13. The combination of claim 4, said cell having a window through which the beam repeatedly passes, said window forming a portion of said cell substantially opposite said planar mirror, and said window having mutually plane-parallel surfaces, both angled relative to the beam in such relation that the reflection loss resulting from incidence of the beam on said surfaces is essentially zero.

14. The combination of claim 13 wherein said window is glassy and free of anti-reflection coatings.

15. The combination of claim 13 wherein the normal to said mutually plane-parallel surfaces is at Brewster's angle to said beam.

* * * * *